Dec. 17, 1929.   A. V. KINSEL   1,739,841
PISTON AND PISTON RING
Filed Jan. 25, 1928

Inventor
Arthur V. Kinsel
By Lyon & Lyon
Attorneys

Patented Dec. 17, 1929

1,739,841

UNITED STATES PATENT OFFICE

ARTHUR V. KINSEL, OF LOS ANGELES, CALIFORNIA, ASSIGNOR OF ONE-HALF TO CLARENCE WATTS, OF LOS ANGELES, CALIFORNIA

PISTON AND PISTON RING

Application filed January 25, 1928. Serial No. 249,292.

This invention relates to pistons and piston packing such as employed in internal combustion engines. Heretofore it has been impossible to produce packing rings which are sufficiently gas-tight to enable an effective packing to result from the use of a single packing groove. The use of more than one groove materially reduces the area of the solid wall of the piston in contact with the cylinder wall. It therefore would be highly advantageous to provide a packing construction which would be sufficiently gas-tight to enable a single packing "ring" to be used.

The general object of this invention is to produce a packing "ring" of built-up type which will be sufficiently gas-tight to enable a single ring to pack the piston effectively.

A further object of the invention is to provide a composite or built-up piston ring in which the separate rings or ring elements that combine to form the complete ring will have their joints so related that it is impossible to form an open gas leak through the ring.

Further objects of the invention will appear hereinafter.

The invention consists in the novel parts and combinations of parts to be described hereinafter, all of which contribute to produce an efficient piston and piston ring.

A preferred embodiment of the invention is described in the following specification, while the broad scope of the invention is pointed out in the appended claims.

Figure 1:
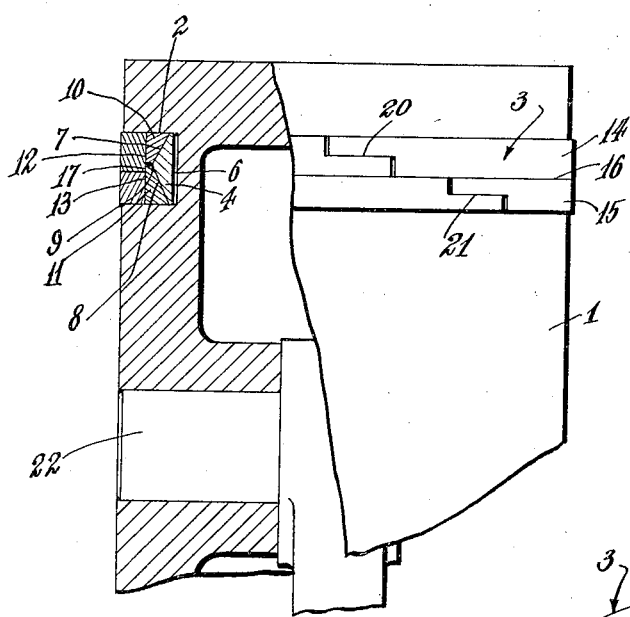
Figure 1 is a side elevation and partial section through a piston embodying my invention, the low portion of the piston being broken away.
Figure 2:
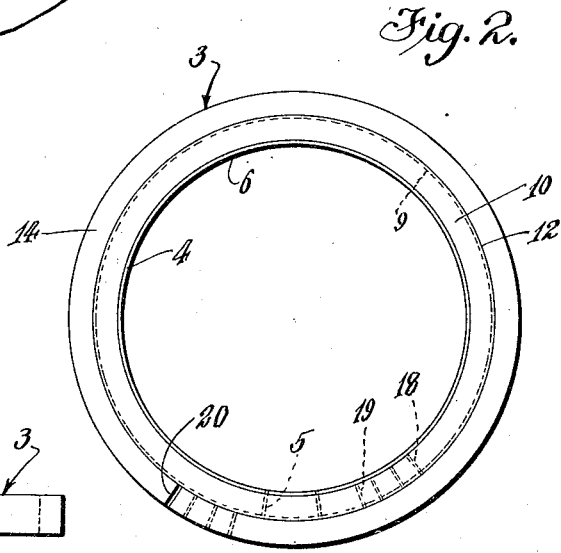
Figure 2 is a plan of the complete piston ring removed from the piston.

Referring to the drawing, 1 represents a piston head having a single circumferential groove 2 which receives the complete packing ring 3, the said packing ring 3 being composed of smaller rings or ring elements which are so constructed that a firm outward pressure will be exerted against the cylinder wall and the sides of the groove, and at the same time no gas leak can be formed through the "ring" between the ring elements. In other words, I construct this complete ring so that there is always a lap of metal to metal between adjacent joints, through which a gas leak might occur.

Figure 3:
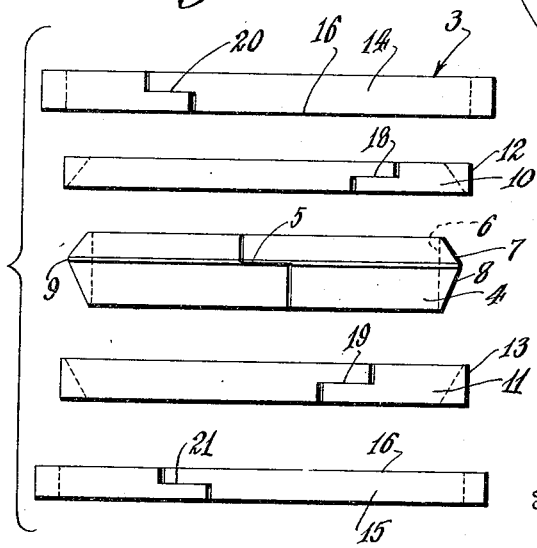
Figure 3 is a side elevation showing all of the ring elements which compose the complete ring in side elevation and in the relative positions which they will have when they come together to form the complete ring.

The complete ring includes an expansion ring 4 which is placed at the bottom of the groove 2. This expansion ring is preferably in the form of a split ring having a scarf joint 5 (see Fig. 3). This ring may have a cylindrical inner face 6 to correspond with the cylindrical face at the bottom of the groove. On its outer side it has two inclined faces 7 and 8 which come together to form a peak or ridge 9 which extends around the outer side of the expansion ring. I prefer to give the faces 7 and 8 a slightly different angle of inclination so that the peak 9 is located slightly to one side of the middle plane of this expansion ring.

I also employ two wedge rings 10 and 11, which have inclined inner faces corresponding to the inclined faces 7 and 8, which seat upon the inclined faces of the inner expansion ring; the outer sides of the wedge rings 10 and 11 have cylindrical faces 12 and 13, respectively. On the outer side of the wedge rings 10 and 11, I provide packing ring means forming an outer packing "ring", and this outer "ring" is preferably in the form of two split rings 14 and 15, which fill the outer portion of the groove, their meeting faces 16 coming together at a point which is out of line with the joint formed between the wedge rings 10 and 11 at the peak 9. In order to accomplish this, if the peak 9 is produced on the inner expansion ring at a point above the middle plane of the expansion ring, then the upper outer ring 14 would be of greater width than the lower ring 15. In this way, a lap 17 of metal to metal will be formed between the meeting faces or joint 16 of the rings 14 and 15 and the joint between the wedge rings 10 and 11.

With a ring having these features of construction, it will be evident that any gas leaking past the upper ring 14 into the upper portion of the groove 6 will be sealed from passing downwardly by the ring 10. In this connection, it should be understood that the ring 10 has a scarf joint 18 (see Fig. 3), but the meeting faces at the scarf joint form an effective seal for preventing the gas passing downwardly. A similar scarf joint 19 is formed on the wedge ring 11. These joints 18 and 19 are preferably of the same character, that is, they are both "rights" or both "lefts".

The outer rings 14 and 15 are also provided with scarf joints 20 and 21, respectively, (see Fig. 3) and these joints are of the same character but opposite in character to the joints 18 and 19, that is to say, if the two joints 18 and 19 are made right-hand, then the two joints 20 and 21 will be made left-hand. This prevents any possibility of two joints, such as the joints 19 and 21, coinciding with each other if one of the rings should work around into a position to permit this.

The rings 10 and 14 are of different widths so that even if the two scarf joints 18 and 20 should move into alignment, there would be a lap of metal to metal between the horizontal parts of the scarfs; the horizontal part of each scarf is located at the middle plane of its ring.

This is also true of the rings 11 and 15. So there are laps of metal to metal between all joints in the ring elements that compose the complete ring. If desired, the expansion ring 4 can be made in two pieces, that is divided at the middle plane of the ring.

A built-up piston ring having these features of construction is substantially gas-tight, and hence I can employ a single built-up packing ring in a single groove in the piston. This leaves more bearing surface between the wrist pin 22 and the lower edge of the groove 6 than it is possible to have when more than one packing groove is used.

It is understood that the embodiment of the invention described herein is only one of the many embodiments this invention may take, and I do not wish to be limited in the practice of the invention, nor in the claims, to the particular embodiment set forth.

What I claim is:—

1. In a packing ring to be received in the packing groove of a piston, the combination of an inner expansion ring having a substantially cylindrical inner face to be received at the bottom of the groove and having inclined outer faces, a pair of wedge-rings seating respectively on the outer inclined faces of the inner ring and having substantially cylindrical outer faces, and packing means having a cylindrical face seating against the cylindrical faces of the wedge-rings and having joints located out of alignment with the joint formed between the adjacent edges of the wedge-rings.

2. In a packing ring to be received in the packing groove of a piston, the combination of an inner expansion ring having a substantially cylindrical inner face to be received at the bottom of the groove and having inclined outer faces, a pair of wedge-rings seating respectively on the outer inclined faces of the inner ring and having substantially cylindrical outer faces, a pair of outer packing rings in the groove seating against the cylindrical faces of the wedge rings and having their meeting faces out of line with the joint between the adjacent edges of the wedge-rings.

3. In a packing ring to be received in the packing groove of a piston, the combination of an inner expansion ring having a substantially cylindrical inner face to be received at the bottom of the groove and having inclined outer faces, a pair of wedge-rings seating respectively on the outer inclined faces of the inner ring and having substantially cylindrical outer faces, and a pair of outer packing rings having substantially cylindrical faces on their inner sides seating against the cylindrical faces of the wedge-rings, said outer packing rings filling the width of the groove, and one of the outer packing rings being of greater width than the other so that the adjacent meeting faces of the outer packing rings are located out of line with the joint between the adjacent edges of the wedge-rings.

4. In a packing ring to be received in the packing groove of a piston, the combination of an inner expansion ring having inclined outer faces meeting together to form a peak located out of line with the middle plane of the expansion ring, and received in the bottom of the groove, a pair of wedge-rings with inclined faces seating against the inclined faces of the expansion ring with their adjacent edges meeting to form a joint adjacent the said peak, and a pair of outer packing rings seating against the outer faces of the wedge-rings, said outer packing rings having their meeting faces located out of line with the joint between the adjacent faces of the wedge-rings.

5. In a packing ring to be received in the packing groove of a piston, the combination of an inner expansion ring having inclined outer faces meeting together to form a peak located out of line with the middle plane of the expansion ring, and received in the bottom of the groove, a pair of wedge-rings with inclined faces seating against the inclined faces of the expansion ring with their adjacent edges meeting to form a joint adjacent the said peak, and a pair of outer packing rings seating against the outer faces of the wedge-rings, said outer packing rings having their meeting faces located out of line with the joint between the adjacent faces of the wedge-rings, said wedge-rings being in the form of split rings freely movable around the axis of the piston when in the cylinder, independently of each other, with scarf joints of the same character, said outer packing rings having scarf joints of a different character from the corresponding wedge-rings upon which they seat.

6. A piston for internal combustion engines having a head with a single circumferential groove and having a wrist pin, an expansion ring seating in the bottom of the groove and having inclined outer faces meeting together to form a peak, wedge-rings in the form of split rings of wedge-shaped cross section seating respectively on the inclined faces of the inner expansion ring, and a pair of outer packing rings seating in the groove on the outer faces of the wedge-rings, said outer packing rings having their meeting faces disposed out of line with the joint formed between the wedge-rings.

Signed at Los Angeles, California, this 18th day of January 1928.

ARTHUR V. KINSEL.